(12) United States Patent
Powar et al.

(10) Patent No.: US 12,141,134 B1
(45) Date of Patent: Nov. 12, 2024

(54) METHOD AND SYSTEM FOR GUIDING LARGE LANGUAGE MODELS FOR TASK PLANNING AND EXECUTION

(71) Applicant: REDSIFT LIMITED, Altrincham (GB)

(72) Inventors: Rahul Powar, Altrincham (GB); Phong Nguyen, Altrincham (GB)

( * ) Notice: Subject to any disclaimer, the term of this patent is extended or adjusted under 35 U.S.C. 154(b) by 0 days.

(21) Appl. No.: 18/462,544

(22) Filed: Sep. 7, 2023

(51) Int. Cl.
*G06F 16/2455* (2019.01)
*G06F 9/48* (2006.01)
*G06F 16/215* (2019.01)
*G06F 16/242* (2019.01)

(52) U.S. Cl.
CPC ........ *G06F 16/2433* (2019.01); *G06F 9/4843* (2013.01); *G06F 16/215* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 10,417,037 B2* | 9/2019 | Gruber | .................... | H04W 4/02 |
| 2023/0368284 A1* | 11/2023 | Sheikh | .................. | H04L 9/0618 |
| 2024/0185001 A1* | 6/2024 | Nagaraju | .............. | G06F 40/284 |
| 2024/0253224 A1* | 8/2024 | Rose | ...................... | B25J 9/1602 |

* cited by examiner

*Primary Examiner* — Eddy Cheung
(74) *Attorney, Agent, or Firm* — RC Trademark Company (57) ABSTRACT

Disclosed is method for guiding Large Language Models (LLMs) for task planning and execution, method comprising creating playbook database (302) comprising set of playbooks (SOP); obtaining user query (308) received by Large Language Model (LLM) (306, 208); determining whether or not given task (GT) matches corresponding descriptor of any playbook from amongst SOP; and wherein when it is determined that GT matches given descriptor of given playbook (GP) (314, 400) from amongst SOP, LLM selects one or more ET (212, 316); a software framework associated with the LLM tracks and executes the given set of sub-tasks in the given playbook, using the one or more external tools, in coordination with the LLM; and LLM generates query response including results of the execution of the given set of sub-tasks, and sends the query response to the user device.

20 Claims, 5 Drawing Sheets

METHOD AND SYSTEM FOR GUIDING LARGE LANGUAGE MODELS FOR TASK PLANNING AND EXECUTION

TECHNICAL FIELD

The present disclosure relates to methods for guiding Large Language Models (LLMs) for task planning and execution. Moreover, the present disclosure relates to systems for guiding Large Language Models (LLMs) for task planning and execution. Furthermore, the present disclosure relates to computer program products.

BACKGROUND

In recent years, large language models (LLMs) have emerged as a transformative advancement in a field of natural language processing (NLP). The LLMs are a type of artificial intelligence models designed to process and generate human language, where the LLMs are trained on massive amounts of text data to learn the patterns, structures, and nuances of the human language. The LLMs that are designed to understand and generate the human language, display remarkable capabilities in executing a wide range of computing tasks.

However, reasoning capabilities of the LLMs are limited which hinders the capability of the LLMs to execute the computing tasks. Although, a large number of solutions have been applied to the LLMs to improve the reasoning capability of the LLMs. Moreover, in some solutions, the LLMs are equipped with a capability to generate plans and use external software tools to improve responses generated from the LLMs for execution of the computing tasks. However, for highly complex computing tasks that require analysis with multiple steps, the responses generated from the LLMs for the execution of the highly complex computing tasks are still inconsistent, incomplete and incorrect at times. Therefore, in light of the foregoing discussion, there exists a need to overcome the aforementioned drawbacks.

SUMMARY

The aim of the present disclosure is to provide a method, a system, and a computer program product to get accurate and consistent results in execution of tasks. The aim of the present disclosure is achieved by a method, a system, and a computer program product for guiding Large Language Models (LLMs) for task planning and execution as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, the present disclosure provides a method for guiding Large Language Models (LLMs) for task planning and execution, the method comprising:
- creating a playbook database comprising a set of playbooks, wherein each playbook has a corresponding descriptor indicative of a task that it guides execution of, and comprises plain text descriptions of a corresponding set of sub-tasks to be executed for execution of the task;
- obtaining a user query received by a Large Language Model (LLM), wherein the user query pertains to a request for execution of a given task; and
- determining whether or not the given task matches the corresponding descriptor of any playbook from amongst the set of playbooks;
- wherein when it is determined that the given task matches a given descriptor of a given playbook from amongst the set of playbooks:
  - the LLM selects one or more external tools, wherein the one or more external tools read the plain text descriptions of the given set of sub-tasks;
  - a software framework associated with the LLM tracks and executes the given set of sub-tasks in the given playbook, using the one or more external tools, in coordination with the LLM; and
  - the LLM generates a query response including results of the execution of the given set of sub-tasks, and sends the query response to the user device.

The method significantly improves a consistency and an accuracy of the second response that is generated as a result of the execution of the given task. The consistency and the accuracy of the second response is improved as the execution of the given task is guided by the given playbook, which ensures that accurate and complete steps are performed for the execution of the given task, by executing the given set of sub-tasks in the given playbook.

In a second aspect, the present disclosure provides a system for guiding Large Language Models (LLMs) for task planning and execution, the system comprising:
- a data repository; and
- at least one processor communicably coupled to the data repository, wherein the at least one processor is configured to execute a software framework to:

create a playbook database comprising a set of playbooks, at the data repository, wherein each playbook has a corresponding descriptor indicative of a task that it guides execution of, and comprises plain text descriptions of a corresponding set of sub-tasks to be executed for execution of the task;

obtain a user query received by a Large Language Model (LLM), wherein the user query pertains to a request for execution of a given task; and determine whether the given task matches the corresponding descriptor of any playbook from amongst the set of playbooks;

wherein when it is determined that the given task matches a given descriptor of a given playbook from amongst the set of playbooks:

the LLM selects one or more external tools to execute the given task;

the software framework associated with the LLM tracks and executes the given set of sub-tasks in the given playbook, using the one or more external tools, in coordination with the LLM; and the LLM generates a query response including results of the execution of the given set of sub-tasks, and sends the query response to the user device.

The system, which is used to implement the method, significantly improves a consistency and an accuracy of the second response that is generated as a result of the execution of the given task. The consistency and the accuracy of the second response is improved as the execution of the given task is guided by the given playbook, which ensures that accurate and complete steps are performed for the execution of the given task, by executing the given set of sub-tasks in the given playbook.

In a third aspect, the present disclosure provides a computer program product comprising a non-transitory computer-readable storage medium having computer-readable instructions stored thereon, the computer-readable instructions being executable by at least one processor configured to execute the method of the first aspect.

Throughout the present disclosure, the term "Large Language Model" (LLM) refers to a form artificial intelligence model which is designed to process, understand, and generate human language. Known Large Language Models may be used in the present invention. Notably, the LLMs are capable of learning patterns, structures and nuances of the human language which enables the LLMs to develop an advanced understanding of the human language and generate logical text in form of human language. It will be appreciated that the LLMs rely on use of deep learning techniques such as use of transformers that excels in understanding long-range dependencies in any sequence of data, and hence make the LLMs more equipped for an advanced processing, understanding and generation of the human language. Thus, LLMs are suitable for use in task planning and execution related to various technical domains, as the task planning and execution related to said various technical domains require text generation, translation, question answering and the like of the human language which is made possible via the use of LLMs. In this regard, the method is being implemented to guide or instruct the LLMs for task planning and execution through a step-by-step process that ensures more accurate and consistent results.

The method comprises creating the playbook database that comprises the set of playbooks, wherein the each playbook has the corresponding descriptor indicative of the task that it guides execution of, and comprises the plain text descriptions of the corresponding set of sub-tasks to be executed for the execution of the task. Throughout the present disclosure, the term "playbook" refers to a data structure (for example, in the form of a computer readable file) which is created to contain information about a plan that describes required steps that are to be followed and executed for the execution of the task which the playbook guides the execution of. It will be appreciated that the information is stored in the each playbook in form of digital text written in human language. Notably, the information stored in the each playbook contains information related to the corresponding descriptor indicative of the task that the playbook guides execution of, and the plain text descriptions of the corresponding set of sub-tasks to be executed for the execution of the task.

Throughout the present disclosure, the term "corresponding descriptor" refers to an attribute or feature that enables to determine the execution of which particular task is being guided by a particular playbook. Notably, the corresponding descriptor plays a crucial role in distinguishing each playbook from all other playbooks present in the set of playbooks. Optionally, the corresponding descriptor of the each playbook is stored in form of text in the each playbook. Optionally, the corresponding descriptor of the each playbook is a corresponding title of the each playbook, stored in the form of text in the each playbook. For example, a text of the corresponding descriptor of an exemplary playbook is "Check why a website is not responding, working, loading as expected", which is stored in the exemplary playbook.

Throughout the present disclosure, the term "corresponding set of sub-tasks" refers to one or more intermediate tasks that are to be executed in a required manner to enable the guidance of the corresponding task by the each playbook. Notably, each sub-task from amongst the corresponding set of sub-tasks is a corresponding computing operation to be performed. Throughout the present disclosure, the term "plain text descriptions" refers to a textual description written in natural human language that describes how to execute each sub-task and the external tools required for the execution of the each sub-task from amongst the corresponding set of sub-tasks. In other words, the plain text descriptions are text descriptions of the corresponding set of sub-tasks. Thus, the corresponding set of sub-tasks are easy to write. Moreover, the corresponding set of sub-tasks are suitable to be read, processed and understood by the LLM.

For example, the plain text descriptions of the of the corresponding set of sub-tasks is:

"1. Check that DNS is configured for the domain correctly and returns a valid IP address;
2. Check that each of the IPs has an open port on 80 and 443;
3. If both ports are open, use curl to check that the open ports are returning valid HTML pages and nothing is wrong with the SSL configuration via HTTPS;
4. If only one ports is open, use curl to check that open port is returning valid HTML. Note that this is unusual.
5. If no web ports are open, this is likely the problem.
6. If everything looks ok, as a final check return step 3 from locations in each continent to ensure there are no routing problems and all responses are similar."

Throughout the present disclosure, the term "playbook database" refers to a database that is created for the purpose of storing the set of playbooks in an organized manner. Optionally, the playbook database is a folder that contains corresponding files of the set of playbooks. Notably, the creation of the playbook database provides a readily available library from which the given playbook from amongst the set of playbooks is accessed whenever required for guiding the execution of the given task. Optionally, the playbook database is created using a software that is capable of generating text files. Optionally, the playbook database is created inside a GitHub® repository. It will be appreciated that there are two possible ways to add any playbook into the playbook database. Firstly, by adding a corresponding text file of any playbook into the playbook database (for example, inside the GitHub® repository). Secondly, by allowing the user to add any playbook into the playbook database when no suitable playbook is found therein, via a chat interface of the software framework in the user device. Throughout the present disclosure, the term "set of playbooks" refers to one or more playbooks that are stored in the playbook database, where each playbook from amongst the set of playbooks is created to guide the execution of a specific task.

Optionally, the step of creating the playbook database comprises:
- receiving corresponding descriptors and plain text descriptions of corresponding sets of sub-tasks, for a plurality of playbooks;
- performing at least one sanity check on the plurality of playbooks;
- determining whether or not at least one of the plurality of playbooks passes the at least one sanity check; and
- when it is determined that the at least one of the plurality of playbooks passes the at least one sanity check, adding the at least one of the plurality of playbooks, to the playbook database.

In this regard, the term "plurality of playbooks" refers to different multiple playbooks that guide the execution of respective different tasks related to various technological domains, wherein correct and appropriate playbooks from amongst the plurality of playbooks are chosen to be added in the playbook database as a part of the set of playbooks. Notably, the corresponding descriptors and the plain text descriptions of the corresponding sets of sub-tasks, for the plurality of playbooks are received from the user via the user device or from a database where the corresponding descriptors and the plain text descriptions of the corresponding sets of sub-tasks, for the plurality of playbooks are stored. It will be appreciated that receiving the corresponding descriptors and the plain text descriptions of the corresponding sets of sub-tasks, for the plurality of playbooks ensures that adequate information related to the plurality of playbooks is available for the at least one of the plurality of playbooks to be added to the playbook database. Throughout the present disclosure, the term "at least one sanity check" refers to one or more tests that are performed on the plurality of playbooks in order to test a quality and a correctness of the plurality of playbooks.

In this regard, to check the correctness of the plurality of playbooks, the at least one sanity check is used to check how distinctive and unambiguous is the corresponding descriptor of the each playbook from amongst the plurality of playbooks is from the corresponding descriptors of the set of playbooks in the playbook database. Likewise, to check the quality of the plurality of playbooks, the at least one sanity check is used check a quality of the plain text descriptions of the corresponding set of sub-tasks of the each playbook from amongst the plurality of playbooks. Notably, performing the at least one sanity check on the plurality of playbooks enable to determine which are the at least one of the plurality of playbooks that are appropriate to be added to the playbook database. Throughout the present disclosure, the term "at least one of the plurality of playbooks" refers to one or more playbooks that are appropriate to be added to the playbook database as the at least one of the plurality of playbooks have passed the at least one sanity check. It will be appreciated that determining the at least one of the plurality of playbooks to pass the at least one sanity check indicates that the correctness and the quality is good enough for the at least one of the plurality of playbooks to be added in the playbook database, and subsequently, the at least one of the plurality of playbooks are added to the plurality database. The technical effect is that only correct, appropriate and good quality playbooks are determined as the at least one of the plurality of playbooks to be added to playbook database. A technical effect of similarity-score-based sanity checking is that only distinct playbooks that relate to distinct tasks are added to the playbook database, thereby enabling efficient memory utilization and minimizing errors in matching tasks to playbook descriptors. Particularly, the effect can be achieved by using less computational resources (such as memory, processing power) when the at least one of the plurality of playbooks is added to the plurality database.

In an embodiment, the step of performing the at least one sanity check on the plurality of playbooks comprises at least one of:
- for each playbook from amongst the set of playbooks that are stored in the playbook database, generating a plurality of similarity scores indicative of a similarity between the corresponding descriptor of said playbook in the playbook database and corresponding descriptors of the plurality of playbooks;
- generating quality scores indicative of a quality of the corresponding sets of sub-tasks in the plurality of playbooks, based on the plain text descriptions of the corresponding sets of sub-tasks in the plurality of playbooks, and wherein, the step of determining whether or not the at least one of the plurality of playbooks passes the at least one sanity check comprises at least one of:
- comparing the plurality of similarity scores with a threshold similarity score, wherein the at least one of the plurality of playbooks passes the at least one sanity check when a similarity score associated with its corresponding descriptor is less than the threshold similarity score;
- comparing the quality scores indicative of the quality of the corresponding sets of sub-tasks in the plurality of playbooks with a threshold quality score, wherein the at least one of the plurality of playbooks passes the at least one sanity check when a quality score associated with its corresponding set of sub-tasks is greater than or equal to the threshold quality score.

In this regard, the term "similarity score" refers to a score that indicates how much similarity exists between two corresponding descriptors of any two playbooks. It will be appreciated that the similarity score between any two playbooks is generated using embeddings of the corresponding descriptors of those two playbooks. Optionally, various different metrics that are generated using the embeddings of the corresponding descriptors can be used as the similarity score between those two playbooks. Optionally, cosine vector values generated using the corresponding descriptors of any two playbooks are preferably used as the similarity score between those two playbooks. Notably, a high similarity score indicates a low distinction between any two playbooks, whereas a low similarity score indicates a high distinction between any two playbooks. In this regard, each similarity score from amongst the plurality of similarity scores is used to indicate the similarity between said playbook in the playbook database and said playbook from amongst the plurality of playbooks. Throughout the present disclosure, the term "said playbook in the playbook database" refers to any single playbook from amongst the set of playbooks in the playbook database. Herein, the plurality of similarity scores comprise respective similarity scores of the said playbook in the playbook database with the plurality of playbooks. It will be appreciated that a different plurality of similarity scores are generated for the each playbook in the playbook database. Thus, the similarity score between the each playbook in the playbook database and the each playbook from amongst the plurality of playbooks is generated.

Throughout the present disclosure, the term "quality scores" refers to scores that evaluate the quality of the plurality of playbooks by evaluating a quality of the corresponding sets of sub-tasks. It will be appreciated that a separate quality score is generated for the corresponding set of sub-tasks for each playbook from amongst the plurality of playbooks. Notably, the quality scores are generated by checking certain parameters in the plain text descriptions of the corresponding sets of sub-tasks in the plurality of playbooks. The certain parameters may be at least one of: whether clear detailed descriptions for each sub-task are present in the plain text descriptions of the corresponding sets of sub-tasks in the plurality of playbooks, if a medium for executing the each sub-task (i.e., either using at least one external tools or using another playbook) is mentioned in the plain text descriptions of the corresponding sets of sub-tasks in the plurality of playbooks, if logical connection is present between the each sub-task in the plain text descriptions of the corresponding sets of sub-tasks in the plurality of playbooks, an accuracy of the each sub-task in the plain text descriptions of the corresponding sets of sub-tasks in the plurality of playbooks. In other words, factors such as, relevance, accuracy, feasibility, and sufficiency of the plain text descriptions of the corresponding sets of sub-tasks in the plurality of playbooks are evaluated to generate the quality scores of the corresponding sets of sub-tasks in the plurality of playbooks. Notably, for any playbook to be of good quality, each sub-task from amongst the corresponding set of sub-tasks in that playbook, must have a reference to at least one external tool, or to another playbook for the execution of that sub-task.

If another playbook is provided as the reference in a sub-task from amongst the corresponding set of sub-tasks in any playbook, then quality of that another playbook is trusted to be good. Moreover, if the at least one external tool is provided as the reference in any sub-task from amongst the corresponding set of sub-tasks in any playbook, then a detailed explanation about parameters of how to use the at least one external tool is not required as the LLM is more than capable to deduce and understand how the at least one external tool is to be used. Optionally, GPT-4® is used to generate the quality scores of the corresponding sets of sub-tasks in the plurality of playbooks. Notably, when another playbook is provided as the reference in any sub-task from amongst the corresponding set of sub-tasks in any playbook, then it is to be ensured that the another playbook is different from that playbook in whose sub-task the another playbook is referenced, in order to avoid circular dependency. The technical effect is that different factors such as distinctiveness and quality of the each playbook from amongst the plurality of playbooks are tested in performing the at least one sanity check on the plurality of playbooks. Optionally, the quality score for the corresponding set of sub-tasks of each playbook from amongst the plurality of playbooks, also includes an explanation of that particular quality score is given, and suggestions regarding how to make changes in the corresponding set of sub-tasks to improve the quality score. Notably, the explanation and the suggestions in the quality scores are provided in JSON format. In this regard, the term "threshold similarity score" refers to a reference value of the similarity score which is used to generate the comparison of the plurality of similarity scores with the threshold similarity score, for the at least one of the plurality of playbooks. Notably, the similarity score for the at least one of the plurality of playbooks being lower than the threshold similarity score indicates that the at least one of the plurality of playbooks is sufficiently distinct from set of playbooks in the playbook database. Thus, the at least one of the plurality of playbooks passes the at least one sanity check. Throughout the present disclosure, the term "threshold quality score" refers to a reference value of the quality score which is used to generate the comparison of the quality scores with the threshold quality score. Notably, the quality score for the at least one of the plurality of playbooks being higher than the threshold quality score indicates that the at least one of the plurality of playbooks has a sufficiently good quality to be added in the playbook database. Thus, the at least one of the plurality of playbooks passes the at least one sanity check. The technical effect is that the at least one of the plurality of playbooks is able to pass the at least one sanity check only when the at least one of the plurality of playbooks is appropriate and is of good quality. Particularly, the effect can be achieved by using less computational resources (such as memory, processing power) when determining whether the at least one of the plurality of playbooks passes the at least one sanity check. Moreover, the method comprises obtaining the user query received by the Large Language Model (LLM), wherein the user query pertains to the request for execution of the given task.

Throughout the present disclosure, the term "user query" refers to a form of request that is raised by a user for the LLM for the execution of the given task. Notably, the user query contains information regarding what is the given task which the user wants to be executed, by mentioning or indicating the given task in the user query. Optionally, the user query is provided by the user to the LLM using a user language interface in the user device. Optionally, the user is provided with a text box in the user device to type the user query. It will be appreciated that the obtaining of the user query by the LLM enables the LLM to process and understand the user query to determine what is the given task that the user wants to be executed. Notably, the LLM uses its ability to understand the human language to determine the given task from the user query. Throughout the present disclosure, the term "given task" refers to a particular computer implemented task or operation related to any technological domain.

In an exemplary embodiment, a user query that is obtained is "why a website example.com is not working as expected?", wherein the user query pertains to a request for execution of a given task of "to determine why a website example.com is not working as expected?". Furthermore, the method comprises determining whether or not the given task matches the corresponding descriptor of any playbook from amongst the set of playbooks. In this regard, as the given task is determined from the user query, the given playbook that correctly guides the execution of the given task needs to be determined from the set of playbooks for guiding the execution of the given task. Notably, any playbook from amongst the set of playbooks is determined to be the given playbook that correctly guides the execution of the given task, if the corresponding descriptor of that playbook indicates that the task which that playbook guides the execution of, is same as the given task. It will be appreciated that the matching of the given task and the corresponding descriptor of any playbook indicates that the task which that any playbook guides the execution of is same as the given task. Subsequently, to determine if the given task matches the corresponding descriptor of any playbook is done by comparing the given task with the corresponding descriptor of the each playbook from amongst the set of playbooks.

Optionally, the step of determining whether or not the given task matches any corresponding descriptor of any playbook from amongst the set of playbooks comprises comparing a context of corresponding descriptors of the set of playbooks with a context of the given task, wherein when the context of any corresponding descriptor of any playbook matches the context of the given task, then that playbook is selected to be the given playbook. In this regard, the term "context of corresponding descriptors" as used herein refers to an understanding of the information that the corresponding descriptors are conveying, i.e., an understanding of what the corresponding task is which the each playbook from amongst the set of playbooks guides the execution of. Notably, a content of the each playbook from amongst the set of playbooks is integrated into the context of the corresponding descriptors of the set of playbooks. Optionally, the context of the corresponding descriptors of the set of playbooks includes only a corresponding title of the each playbook from amongst the set of playbooks, to reduce a length of characters in the context of the corresponding descriptors of the set of playbooks. The term "context of the given task" refers to an understanding of what the given task is that needs to be executed. Notably, by comparing the context of the corresponding descriptors of the set of playbooks with the context of the given task, the understanding of what the corresponding task is which the each playbook from amongst the set of playbooks guides the execution of, is compared with the understanding of what the given task is that needs to be executed. Subsequently, matching of the context of any corresponding descriptor of any playbook with the context of the given task indicates that the understanding of what the corresponding task is which that playbook guides the execution of, is similar to the understanding of what given task is that needs to be executed. Thus, that playbook is selected to be the given playbook to guide the execution of the given task. The technical effect is that a whole content of any of the playbook from amongst the set of playbooks needs not to be taken into account when determining whether the given task matches any corresponding descriptor of any playbook from amongst the set of playbooks. Particularly, the effect can be achieved by using less computational resources (such as memory, processing power) when comparing the context of the corresponding descriptors of the set of playbooks with the context of the given task. This allows to only take the context of the corresponding descriptors of the set of playbooks into account for comparing with the context of the given task, which requires less processing power and memory storage.

In an embodiment, the LLM may be employed for the step of determining whether or not the given task matches any corresponding descriptor of any playbook from amongst the set of playbooks comprises comparing a context of corresponding descriptors of the set of playbooks with a context of the given task.

Optionally, the step of determining whether or not the given task matches the any corresponding descriptor of any playbook from amongst the set of playbooks further comprises:

generating embeddings of the corresponding descriptors of the set of playbooks and storing the embeddings in a vector database;
transforming the user query into a query embedding;
identifying that playbook whose corresponding embedding most closely matches the query embedding, based on at least one of: a cosine similarity score, a threshold value, to be the given playbook.

In this regard, the term "embeddings" as used herein refers to vector representations of the corresponding descriptors of the set of playbooks. The technical effect is that generating the embeddings of the corresponding descriptors of the set of playbooks, advantageously, reduces size of a required memory for storing the information of the corresponding descriptors of the set of playbooks. Throughout the present disclosure, the term "vector database" refers to a database that is created for the purpose of storing vector values. As a result, the generated embeddings of the corresponding descriptors of the set of playbooks are stored in the vector database. Throughout the present disclosure, the term "query embedding" refers to a vector representation of the user query. Notably, the user query is transformed into the query embedding to make the user query suitable to be matched with the corresponding descriptors of the set of playbooks, as the embeddings for the corresponding descriptors of the set of playbooks have been generated. Subsequently, to determine whether the given task matches the any corresponding descriptor of any playbook from amongst the set of playbooks, the corresponding embeddings of the set of playbooks are matched with the query embedding.

In this regard, for each playbook from amongst the set of playbooks, the similarity score which indicates the similarity between that playbook and the user query is generated using embedding of that playbook and the query embedding. Notably, various types of similarity scores can be generated between the corresponding embeddings of the set of playbooks and the query embedding, to indicate the similarity between the corresponding embeddings and the query embedding. If a similarity score between a particular playbook and the user query is closer to 0, then that particular playbook and the user query are significantly different. If a similarity score between a particular playbook and the user query is closer to 1, then that particular playbook and the user query are significantly identical. It will be appreciated that the cosine similarity score is a type of similarity score that is generated between the corresponding embeddings of the set of playbooks and the query embedding, where the cosine similarity score indicates the similarity between the corresponding embeddings and the query embedding. In an implementation, that playbook whose cosine similarity score is maximum from amongst all the cosine similarity scores generated for set of playbooks, is determined as the playbook whose corresponding embedding most closely matches the query embedding. the similarity score of that playbook whose corresponding embedding most closely matches the query embedding is compared against a certain threshold value that is range of 0 to 1 (preferably selected to be 0.75), to confirm if the similarity between the corresponding descriptor of that playbook and the user query is of a sufficient level. Subsequently, the similarity score of that playbook whose corresponding embedding most closely matches the query embedding, needs to be greater than the threshold value for the similarity between the corresponding descriptor of that playbook and the user query to be of the sufficient level. Optionally, the threshold value is selected via a trial process. If the threshold value is set as too low then, inaccurate plays may get selected as the given playbook, whereas if the threshold value is set as too high then, even accurate playbooks may not get selected as the given playbook.

For example, a vector database "D" comprises of the embeddings of the corresponding descriptors of the set of playbooks that are generated for the set of playbooks. A query embedding "q" is generated for a user query "Q". The query embedding "q" is then compared with all the embeddings present in the vector database "D", and a playbook "A" whose corresponding embedding "v" most closely matches with the query embedding "q". Subsequently, a similarity score of the playbook "A" with the user query is then compared against a threshold value of 0.75 to confirm if the similarity between a corresponding descriptor of the playbook "A" and a given task in the user query is of a sufficient level. If the similarity score of the playbook "A" with the user query is greater than 0.75, then the playbook "A" is selected as a given playbook for guiding an execution of the given task.

The technical effect is that generating the embeddings of the corresponding descriptors of the set of playbooks, advantageously, reduces size of a required memory for storing the information of the corresponding descriptors of the set of playbooks. Particularly, the effect can be achieved by using less computational resources (such as memory, processing power) when the embeddings of the corresponding descriptors of the set of playbooks. Furthermore, when it is determined that the given task matches the given descriptor of the given playbook from amongst the set of playbooks, the LLM selects the one or more external tools, wherein the one or more external tools read the plain text descriptions of the given set of sub-tasks. Throughout the present disclosure, the term "given playbook" refers to a particular playbook from amongst the set of playbooks which is a suitable playbook to correctly guide the execution of the given task, as the task which the given playbook guides the execution of is same as the given task. Throughout the present disclosure, the term "given descriptor" refers to the corresponding descriptor of the given playbook which indicates the what is the task which the given playbook guides the execution of. In this regard, determining that the given task matches the given descriptor of the given playbook from amongst the set of playbooks indicate that the suitable playbook from amongst the set of playbooks is found to correctly guide the execution of the given task. Subsequently, the given playbook is then used according to above mentioned steps of the method to guide the execution of the given task.

Notably, the use of the given playbook to guide the execution of the given task ensures that the given task is always executed to give correct and consistent results. Throughout the present disclosure, the term "one or more external tools" refers to one or more software applications which are available to be accessed and used to perform specific computing functions or operations. Notably, each of the one or more external tools is used to perform a specific computing operation. Some examples of the one or more external tools may include but are not limited to dig, curl, nmap, whois, ping, opens, visualize-IP, and the like. In this regard, the one or more external tools are selected by the LLM according to a suitability and a capability of the one or more external tools to execute the given task. Notably, the one or more external tools are used to read the plain text descriptions of the given set of sub-tasks, in order to form an understanding of what are the required steps or instructions that needs to be followed for the execution of the given task. It will be appreciated that the understanding of the plain text descriptions of the given set of sub-tasks formed by the one or more external tools is then sent to the software framework.

Optionally, the suitability and the capability of the one or more external tools for executing the given task is determined by the LLM using factors such as descriptors of the one or more external tools, data returned by the one or more external tools, external tools listed corresponding to the given set of sub-tasks in the given playbook. Throughout the present disclosure, the term "descriptors of the plurality of external tools" refers to attributes or features of the plurality of external tools which describe what computing operation is performed by each external tool from amongst the plurality of external tools. Throughout the present disclosure, the term "data returned by the plurality of external tools" refers to information about what type of output data is received from the using the each external tool from amongst the plurality of external tools. Throughout the present disclosure, the term "external tools listed corresponding to the given set of sub-tasks in the given playbook" refers to those external tools mentioned in the plain text descriptions of the given set of sub-tasks in the given playbook, to be used for the execution of the given set of sub-tasks in the given playbook. In this regard, the descriptors of the plurality of external tools, the data returned by the plurality of external tools, and the external tools listed corresponding to the given set of sub-tasks in the given playbook, are different factors from amongst which at least one of the these factors is used for determining which are the one or more external tools from amongst the plurality of external tools, that are suitable to be used for executing the given task.

Optionally, the method further comprises generating the first response for the user query and sending the first response to the user device via the LLM, the first response comprising the plain text descriptions of a given set of sub-tasks in the given playbook. Throughout the present disclosure, the term "first response" refers to a computer generated response which is generated to update the user regarding what action is being planned to be taken for the execution of the task in response to the user query. Notably, the first response is generated by the LLM in the natural human language. Throughout the present disclosure, the term "user device" refers to a computing device associated with the user, where the user device is able to communicate with the LLM to receive the first response from the LLM. Optionally, the user device is one of: a computer, a laptop, a mobile phone, a tablet and the like.

In an exemplary embodiment, a first response sent to the user device is:

"Sure, let's diagnose why the website 'example.com' is not working as expected. We will follow a series of steps to identify the issue:
1. Check DNS Configuration: We will verify that the DNS server is configured correctly for the domain and that it returns a valid IP address.
2. Check Open Ports: We will check if the Ips have open ports on 80 and 443.
3. Verify HTML and SSL Configuration: If both ports are open, we will use curl to check that the open ports are returning valid HTML pages, and nothing is wrong with the SSL configuration via HTTPS.
4. Check Single Open Port: If only port is open, we will verify that it's returning valid HTML.
5. Identify No Open Ports Issue: If no web ports are open, this could be the problem.
6. Final Check: If everything looks okay, we will perform a final check from locations in each continent to ensure there are no routing problems and all responses are similar.", for a user query which is "why website example.com is not working as expected".

Furthermore, a software framework associated with the LLM tracks and executes the given set of sub-tasks in the given playbook, using the one or more external tools, in coordination with the LLM. Throughout the present disclosure, the term "software framework" refers to a type of computing software that is compatible to be integrated with the LLM in order to enhance functionalities and capabilities of the LLM. Optionally, the software framework may comprises one or more software application, where each software application in the software framework is designated to perform a specific function. Notably, executing the given set of sub-tasks in the given playbook requires the execution of each sub-task from amongst the given set of sub-tasks, in a required order. In this regard, the execution of the each sub-task from amongst the given set of sub-tasks is done by performing the corresponding computing operation for the each sub-task by using the one or more external tools. In other words, the one or more external tools are accessed and used for performing the corresponding computing operation for each sub-task from amongst the given set of sub-tasks. It will be appreciated that the software framework receives the understanding of the plain text descriptions of the given set of sub-tasks that is formed by the one or more external tools to track and execute the given set of sub-tasks in the given playbook. Notably, the LLM is used to provide coordination between the execution of different individual sub-tasks from amongst the given set of sub-tasks, in order to get a consistent and correct result from the execution of the given set of sub-tasks in the given playbook.

Furthermore, the LLM generates a query response including results of the execution of the given set of sub-tasks and sends the query response to the user device. Throughout the present disclosure, the term "query response" refers to a final response that is prepared for providing an outcome of the user query. It will be appreciated that the query response is indicative of whether the user query obtained has been successfully addressed or not. In this regard, to provide the outcome of the user query in the query response, the results of the execution of the given set of sub-tasks is included in the query response, as the user query pertained to the request for the execution of the given task. Optionally, the results of the execution of the given set of sub-tasks is in form of at least one of: a numerical data, a statement indicating success or failure of the execution of the given task. Notably, the LLM is used to emulate human like interaction with the user in the query response that is generated by the LLM. It will be appreciated that the LLM is communicably coupled to the user device for sending the query response to the user device. Optionally, the query response is provided to the user in a graphical user interface of the user device.

Optionally, when it is determined that the given task does not match any corresponding descriptor of any playbook from amongst the set of playbooks, the method further comprises creating a new playbook to be added to the playbook database, by:
  receiving a corresponding descriptor indicative of the given task, and plain text descriptions of a corresponding set of sub-tasks to be executed for the execution of the given task, for the new playbook;
  performing at least one sanity check on the new playbook;
  determining whether or not the new playbook passes the at least one sanity check; and
  when it is determined that the new playbook passes the at least one sanity check,
    adding the new playbook to the set of playbooks in the playbook database; and
    repeating the step of determining whether or not the given task matches any corresponding descriptor of any playbook from amongst the set of playbooks.

In this regard, the term "new playbook" refers to a playbook that is created specifically for guiding the execution of the given task, when it is determined that the given task does not match any corresponding descriptor of any playbook from amongst the set of playbooks. It will be appreciated that the new playbook is created and added into the playbook database only by the user via the at least one software framework, or by a person who is a technical expert in a technical field related to the given task directly into the playbook database. Notably, the information and criteria required for adding the new playbook to the playbook database is same as it was used to add the set of playbooks in the playbook database. The corresponding descriptor and the plain text descriptions of the corresponding set of sub-tasks, for the new playbook are received from the user via the user device. It will be appreciated that receiving the corresponding descriptor and the plain text descriptions of the corresponding set of sub-tasks, for the new playbook ensures that adequate information related to the new playbook is available for the new playbook to be added to the playbook database. Notably, having the corresponding descriptor of the new playbook indicative of the given task ensures that the given task matches the corresponding descriptor of the new playbook, and thus, the new playbook is then selected as the given playbook for guiding the execution of the given task. Moreover, the step of performing the at least one sanity check on the new playbook ensures that a correctness and a quality of the new playbook is checked before adding the new playbook to the playbook database, where the new playbook is added to the set of playbooks in the playbook database only when it is determined that the new playbook passes the at least one sanity check. It will be appreciated that the step of determining whether or not the given task matches any corresponding descriptor of any playbook from amongst the set of playbooks is repeated after the addition of the new playbook in the playbook database, so that the new playbook is selected as the given playbook to guide the execution of the given task.

The technical effect is that a suitable user defined playbook for guiding the execution of the given task is easily added to the playbook database as the new playbook. Particularly, the effect can be achieved by using less computational resources (such as memory, processing power) when the new playbook is added to the playbook database.

Optionally, wherein when it is determined that the given task does not match the corresponding descriptor of any playbook from amongst the set of playbooks, the method further comprises:
  generating a plan of action for the given task using the LLM, wherein the plan of action comprises a set of LLM-generated sub-tasks to be executed for execution of the given task;
  using at least one of: descriptors of a plurality of external tools, data returned by the plurality of external tools, external tools listed corresponding to the set of LLM-generated sub-tasks in the plan of action, for selecting one or more external tools for executing the given task, from amongst the plurality of external tools, by the LLM;
  executing the set of LLM-generated sub-tasks in the plan of action, using the one or more external tools; and generating a query response for the user query using the LLM and sending the query response from the LLM to the user device, the query response comprising at least one of: a summary of the data returned by the one or more external tools upon execution of the set of LLM-generated sub-tasks in the plan of action, a data returned upon execution of a last LLM-generated sub-task from amongst the set of LLM-generated sub-tasks in the plan of action.

In this regard, the term "plan of action" as used herein refers to a description of a secondary plan that is generated by the LLM to guide the execution of the given task, when no suitable or appropriate playbook is found in the playbook database to guide the execution of the given task. The LLM is used as a task planning agent to generate the plan of action. Notably, the plan of action contains information regarding steps which are required to be performed for the execution of the given task. It will be appreciated that the information regarding the steps is present in the plan of action in form of the set of LLM-generated sub-tasks. Throughout the present disclosure, the term "set of LLM-generated sub-tasks" refers to one or more intermediate tasks that relates to the steps required to be performed for executing the given task, which are generated using reasoning and logical capabilities of the LLM. Subsequently, using the one or more factors that determine what external tools are required to execute the set of LLM-generated sub-tasks, the one or more external tools are selected from amongst the plurality of external tools. In this regard, the one or more external tools are then accessed and used to perform required operations and functions for executing the set of LLM-generated sub-tasks. Notably, results that are generated by the one or more external tools after executing the set of LLM-generated sub-tasks, are collected in form of at least one of: the summary of the data returned by the one or more external tools upon execution of the set of LLM-generated sub-tasks in the plan of action, the data returned upon the execution of the last LLM-generated sub-task from amongst the set of LLM-generated sub-tasks in the plan of action. Throughout the present disclosure, the term "query response" refers to a response that contains information related to a final result of the execution of the given task under the guidance of the plan of action. The technical effect is that the given task is still executed even when no appropriate playbook for guiding the execution of the given is present in the playbook database.

In an implementation, the LLM is trained to generate the plan of action by finetuning the LLM using supervised learning algorithms or using reinforcement learning techniques with human feedback. Some examples of the LLM's that are trained using finetuning are BloombergGPT® and SecureFalcon®.

In another implementation, the LLM is trained to generate the plan of action by using different prompting techniques to improve reasoning capabilities of the LLM. For example, a prompting technique of few-shot prompting provides in-domain knowledge or example input-output pairs using natural language to enable in-context learning of the LLM. Other prompting techniques such as Chain-of-thought (CoT) prompting, Plan-and-solve prompting, zero-shot CoT prompting guides the LLM to construct the set of sub-tasks in the pan of action.

Optionally, in any playbook from amongst the set of playbooks, plain text descriptions of a given sub-task from amongst a corresponding set of sub-tasks in said playbook comprise a reference to one or more other playbooks from amongst the set of playbooks in the playbook database, and wherein when executing the given sub-task, a corresponding set(s) of sub-tasks in the one or more other playbooks are executed. Herein, the term "given sub-task" refers to any particular sub-task from amongst the corresponding set of sub-tasks in said playbook. Notably, providing the reference to the one or more other playbooks from amongst the set of playbooks in the given sub-task indicates that the execution of the given sub-task is to be guided by the one or more other playbooks referred to in the given sub-task. It will be appreciated that the one or more other playbooks from amongst the set of playbooks are referred to in the plain text descriptions of the given sub-task by mentioning the one or more corresponding descriptors of the one or more other playbook from amongst the set of playbooks, in the plain text descriptions of the given sub-task. For example, in a plain text description of a given sub-task which is "Use the playbook DNS-MEASURE to evaluate the security posture of DNS for the domain. This step MUST always be done.", a reference to another playbook is made by mentioning a corresponding descriptor "DNS-MEASURE" in the plain text description of the given sub-task. It will be appreciated that the corresponding set(s) of sub-tasks comprises one or more corresponding sets of sub-tasks of the one or more other playbooks that are referred to in the given sub-task. In this regard, the one or more other playbooks can be used to guide the execution of the given sub-task, only by executing the corresponding set(s) of sub-tasks in the one or more other playbooks referred to in the given sub-task. The technical effect is that the plain text descriptions of the given sub-task is well-defined regarding how the given sub-task is to executed. Particularly, the effect can be achieved by using less computational resources (such as processing power) as only fixed instructions provided in the plain text descriptions of the given sub-task needs to be followed for the execution of the given sub-task.

Optionally, the one or more external tools are accessed via one or more Application Programming Interfaces (APIs). Herein, the term "Application Programming Interfaces" refers to a set of rules or protocols that allows to interact and communicate with the one or more external tools. Notably, each external tool from amongst the one or more external tools are accessed via a corresponding API from amongst the one or more APIs. It will be appreciated that the one or more APIs act as entry points to access the one or more external tools for performing the required computing operations as mentioned in the plain text descriptions of the given set of sub-tasks in the given playbook. The technical effect is the one or more external tools are advantageously, easy to access and use via using the one or more APIs. Particularly, the effect can be achieved by using less computational resources (such as processing power) as the one or more API's act as just a communication medium for interacting with the one or more external tools, which does not require any significant processing.

Optionally, the given set of sub-tasks in the given playbook are executed in at least one of: a sequential order, a graphical order, a dynamically changing order. In this regard, the required manner in which the given set of sub-tasks are to be executed for correctly guiding the execution of the given task by the given playbook, is selected to be the at least one of: the sequential order, the graphical order, a dynamically changing order. Notably, executing the given set of sub-tasks in the given playbook in the at least one of: the sequential order, the graphical order, the dynamically changing order, enables to determine how any sub-task from amongst the given set of sub-tasks is related to another sub-task from amongst the given set of sub-tasks. In other words, executing the given set of sub-tasks in the given playbook in the at least one of: the sequential order, the graphical order, establishes a conditional relationship between sub-tasks from amongst the given set of sub-tasks. When such a conditional relationship between sub-tasks is established, whether a given sub-task will be executed or not, becomes dependent on result of at least one of the other sub-tasks from amongst the given set of sub-tasks, which in turn may result in a change in the original sequential or graphical order. As a result, the order of executing the given set of sub-tasks in the given playbook may be a dynamically changing order to allow a more efficient execution, wherein the efficiency gains directly translate into decrease in computational resources needed for executing the given set of sub-tasks in the given playbook.

It will be appreciated that the execution of the given set of sub-tasks in the given playbook in the at least one of: the sequential order, the graphical order, the dynamically changing order, ensures that a correct and consistent result is generated whenever the given task is executed using the guidance of the given playbook. The technical effect is that the given playbook is beneficially, well defined in regard to when and in which order the each sub-task from amongst the given set of sub-tasks is to be executed. Particularly, the effect can be achieved by using less computational resources (such as processing power) when given set of sub-tasks in the given playbook are executed in at least one of: the sequential order, the graphical order, the dynamically changing order.

Optionally, the given task may be a cyber security task. In this regard, the term "cyber security task" refers to a computing task which is related to finding out software vulnerabilities in any software application which can be used for malicious purposes. Furthermore, such a cyber security task typically comprises preventing access of undesired parties to the computer system. Notably, the cyber security task requires to perform complex multi-step logical operations to get accurate and consistent result for each time the cyber security task is performed. Thus, the effect of the given task being the cyber security task is that the method is beneficially able to accurately and consistently execute highly complex tasks related to web security analysis and diagnostics. Particularly, the effect can be achieved by using less computational resources (such as memory, processing power) when the cyber security tasks is carried out by executing a given set of sub-tasks in a given playbook, which in turn comprises descriptions of a corresponding set of sub-tasks to be executed for execution of the task. This allows a complex task, which is a task that requires that require analysis with multiple steps, and thus otherwise requires a relatively large processing power and or computing memory, to be executed with significantly less computing power, with accuracy and to its completion. The use of the system of the present invention to implement the method of the present invention ensures the provision of consistent responses even for complex tasks, and thus eliminates the need to re-run tasks, in turn saving computing resources.

The present disclosure also relates to the system as described above. Various embodiments and variants disclosed above, with respect to the aforementioned method, apply mutatis mutandis to the system.

Throughout the present disclosure, the term "data repository" refers to a storage medium that may be configured to store the playbook database. Optionally, the data repository may include, but is not limited to, internal storage, external storage, a universal serial bus (USB), a Hard Disk Drive (HDD), a Flash memory, a Secure Digital (SD) card, a Solid-State Drive (SSD), a computer-readable storage medium, a GitHub® repository or any suitable combination of the above mentioned.

Throughout the present disclosure, the term "processor" refers to a computational element that is operable to execute the software framework. Examples of the processor include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor may refer to one or more individual processors, processing devices and various elements associated with a processing device that may be shared by other processing devices. Additionally, one or more individual processors, processing devices and elements are arranged in various architectures for responding to and processing the instructions that execute the software framework. It will be appreciated that the term "at least one processor" refers to "one processor" in some implementations, and "a plurality of processors" in other implementations.

Notably, the at least one processor being communicably coupled to the data repository enables the software framework to access the playbook database whenever required.

Optionally, to create the playbook database, the software framework is further executed to:
receive corresponding descriptors and plain text descriptions of corresponding sets of sub-tasks, for a plurality of playbooks;
perform at least one sanity check on the plurality of playbooks;
determine whether or not at least one of the plurality of playbooks passes the at least one sanity check; and
when it is determined that the at least one of the plurality of playbooks passes the at least one sanity check, add the at least one of the plurality of playbooks, to the playbook database.

Optionally, to perform the at least one sanity check on the plurality of playbooks, the software framework is further executed to at least one of:
for each playbook from amongst the set of playbooks that are stored in the playbook database (302), generate a plurality of similarity scores indicative of a similarity between the corresponding descriptor of said playbook in the playbook database and corresponding descriptors of the plurality of playbooks;
generate quality scores indicative of a quality of the corresponding sets of sub-tasks in the plurality of playbooks, based on the plain text descriptions of the corresponding sets of sub-tasks in the plurality of playbooks;
and wherein to determine whether or not the at least one of the plurality of playbooks passes the at least one sanity check comprises at least one of:
compare the plurality of similarity scores with a threshold similarity score, wherein the at least one of the plurality of playbooks passes the at least one sanity check when a similarity score associated with its corresponding descriptor is less than the threshold similarity score;
compare the quality scores indicative of the quality of the corresponding sets of sub-tasks in the plurality of playbooks with a threshold quality score, wherein the at least one of the plurality of playbooks passes the at least one sanity check when a quality score associated with its corresponding set of sub-tasks is greater than or equal to the threshold quality score.

Optionally, to determine whether or not the given task matches any corresponding descriptor of any playbook from amongst the set of playbooks, the software framework is further executed to compare a context of a corresponding descriptor of the set of playbooks with a context of the given task, wherein when the context of any corresponding descriptor of any playbook matches the context of the given task, then that playbook is selected to be the given playbook (314, 400).

Optionally, wherein to determine whether or not the given task matches the any corresponding descriptor of any playbook from amongst the set of playbooks, the software framework is further executed to:
- generate embeddings of the corresponding descriptors of the set of playbooks and storing the embeddings in a vector database;
- transform the user query (308) into a query embedding;
- identify that playbook whose corresponding embedding most closely matches the query embedding, based on at least one of: a cosine similarity score, a threshold value, to be the given playbook (314, 400).

Optionally, when it is determined that the given task does not match any corresponding descriptor of any playbook from amongst the set of playbooks, to create a new playbook to be added to the playbook database (302), the software framework is further configured to:
- receive a corresponding descriptor indicative of the given task, and plain text descriptions of a corresponding set of sub-tasks to be executed for the execution of the given task, for the new playbook,
- perform at least one sanity check on the new playbook;
- determine whether or not the new playbook passes the at least one sanity check; and
- when it is determined that the new playbook passes the at least one sanity check,
    - add the new playbook to the set of playbooks in the playbook database; and
    - repeat the step of determining whether or not the given task matches any corresponding descriptor of any playbook from amongst the set of playbooks.

Optionally, in any playbook from amongst the set of playbooks, plain text descriptions of a given sub-task from amongst a corresponding set of sub-tasks in said playbook comprise a reference to one or more other playbooks from amongst the set of playbooks in the playbook database (302), and wherein when executing the given sub-task, a corresponding set(s) of sub-tasks in the one or more other playbooks are executed.

Optionally, the set of sub-tasks in the given playbook (314, 400) are executed in at least one of: a sequential order, a graphical order, a dynamically changing. Optionally, the given task is a cyber security task.

The present disclosure also relates to the computer program product as described above. Various embodiments and variants disclosed above, with respect to the aforementioned method and the aforementioned system, apply mutatis mutandis to the computer program product.

EXPERIMENTAL PART

A test was performed to evaluate robustness of the playbook selection mechanism of the present disclosure. In other words, the test was performed to check whether a same playbook would be selected (i.e., would be determined as a match for a given task) when different prompts (i.e., different user queries or different variants of a user query) with a similar meaning (i.e., related to the given task) are obtained.

In the test, one user query was obtained and its 40 variants (i.e., 40 similar user queries with different levels of similarity) were generated using a LLM. As an example, the one user query was "evaluate the security posture of example-.com". In this regard, some of the 40 variants of the user query were "perform a security assessment for example-.com", "audit example.com from a security standpoint", "any security red flags for example.com?", "what potential pitfalls could compromise example.com's safety?", and "is example.com fortified against online pirates?". Then, for each variant of the user query, it was checked whether a corresponding task in said variant matches any corresponding descriptor of any playbook from amongst the set of playbooks. The results of the test showed that the same playbook was chosen every single time (i.e., the same playbook matched each (different) variant of the user query). This 100 percent accuracy demonstrated the robustness of the playbook selection mechanism of the present disclosure and also demonstrated that the innovative playbook-based approach of the present disclosure is not biased against the provided titles (i.e., descriptors) in the playbooks of the set.

DETAILED DESCRIPTION OF THE DRAWINGS

Figure 1A:
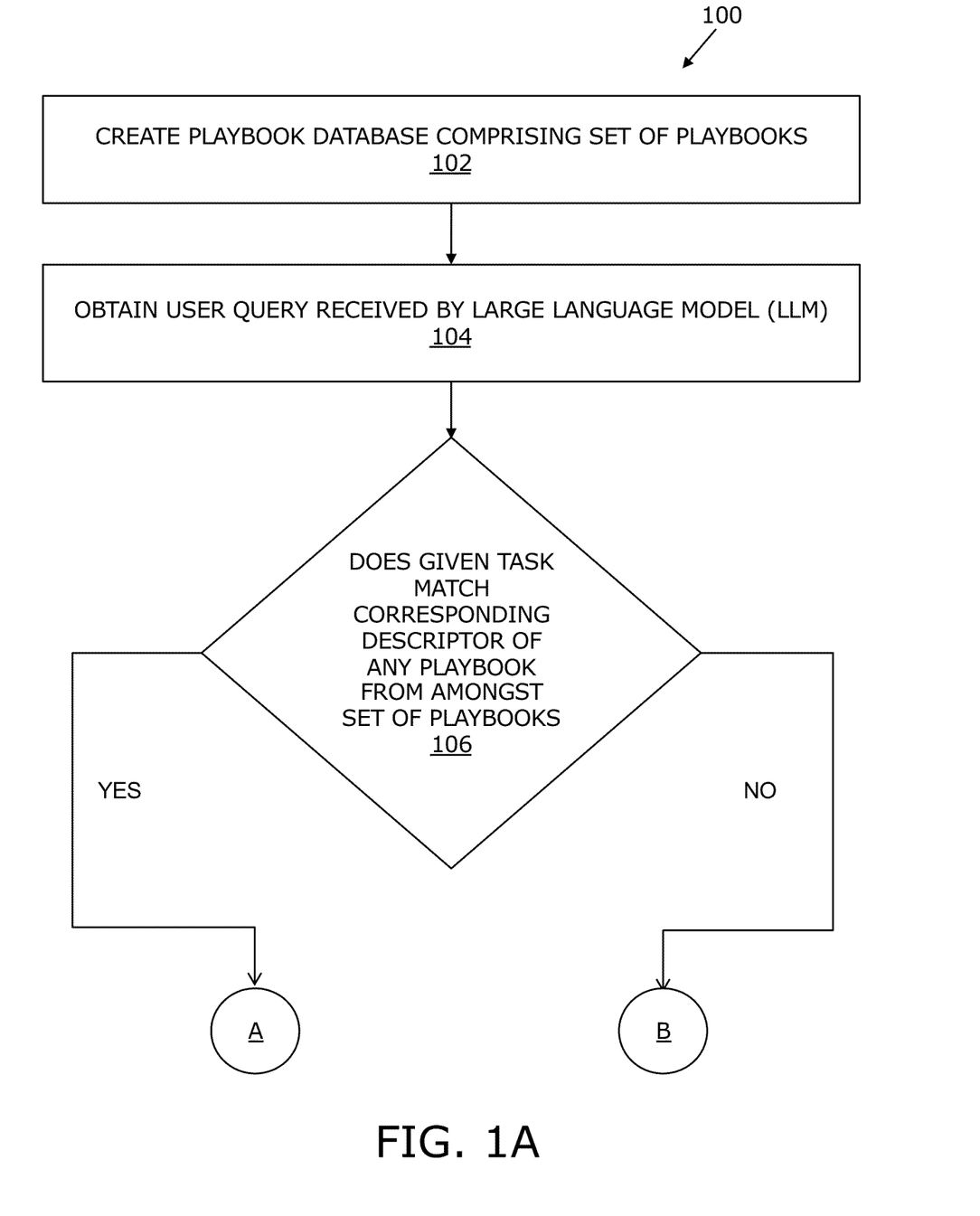
FIGS. 1A and 1B collectively illustrate a flowchart for depicting steps of a method for guiding Large Language Models (LLMs) for task planning and execution, in accordance with an embodiment of the present disclosure.
Figure 1B:
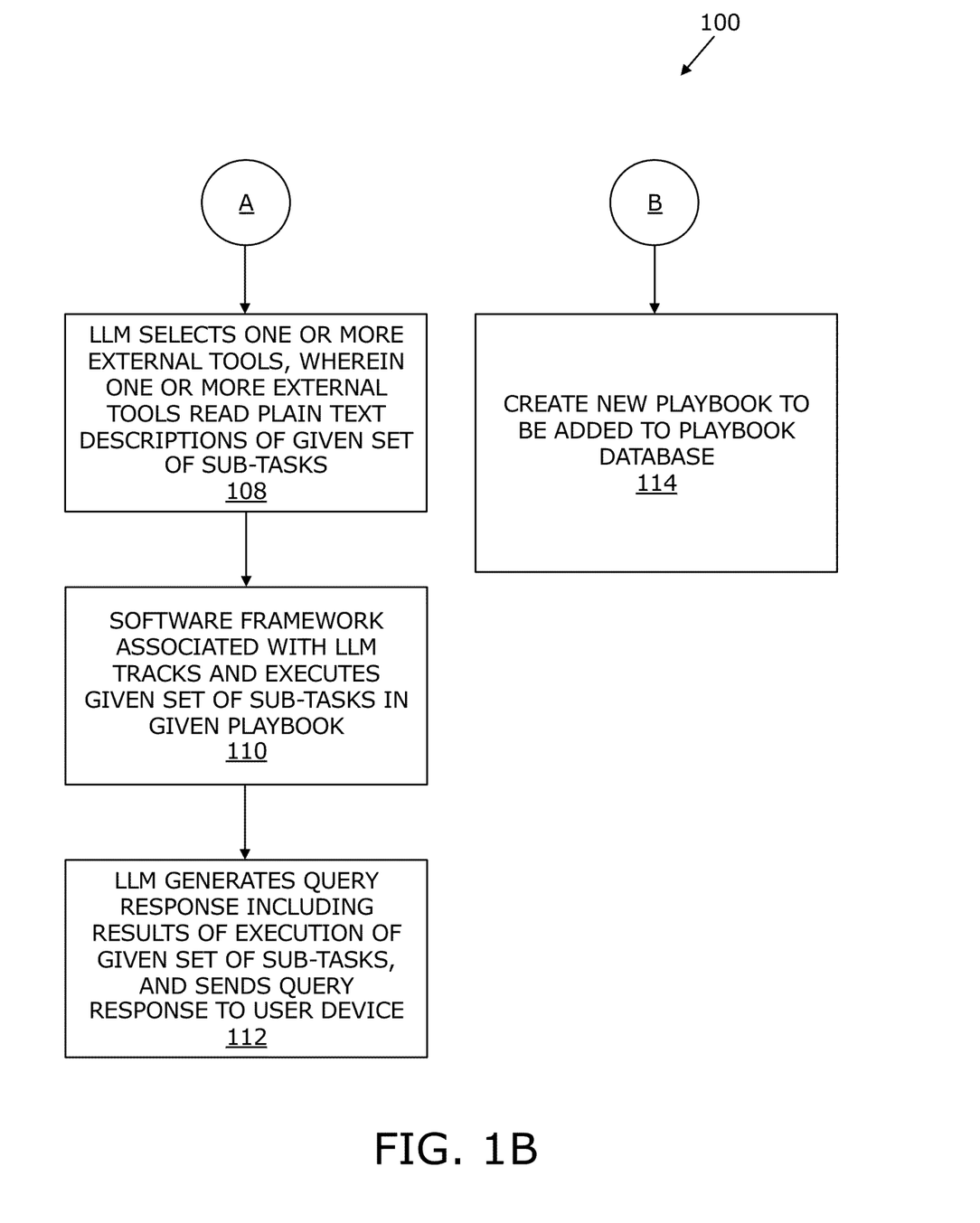

Referring to FIGS. 1A and 1B collectively, illustrated is a flowchart 100 for depicting steps of a method for guiding Large Language Models (LLMs) for task planning and execution, in accordance with an embodiment of the present disclosure. At step 102, a playbook database comprising a set of playbooks is created, wherein each playbook has a corresponding descriptor indicative of a task that it guides execution of, and comprises plain text descriptions of a corresponding set of sub-tasks to be executed for execution of the task. At step 104, a user query received by a Large Language Model (LLM), is obtained, wherein the user query pertains to a request for execution of a given task. At step 106, whether the given task matches the corresponding descriptor of any playbook from amongst the set of playbooks, is determined. When it is determined that the given task matches a given descriptor of a given playbook from amongst the set of playbooks, subsequently, at step 108, the LLM selects one or more external tools, wherein the one or more external tools read the plain text descriptions of the given set of sub-tasks. At step 110, a software framework associated with the LLM tracks and executes the given set of sub-tasks in the given playbook, using the one or more external tools, in coordination with the LLM. At step 112, the LLM generates a query response including results of the execution of the given set of sub-tasks, and sends the query response to the user device. Optionally, when it is determined that the given task does not match any corresponding descriptor of any playbook from amongst the set of playbooks, at step 114 a new playbook is created to be added to the playbook database.

Figure 2:
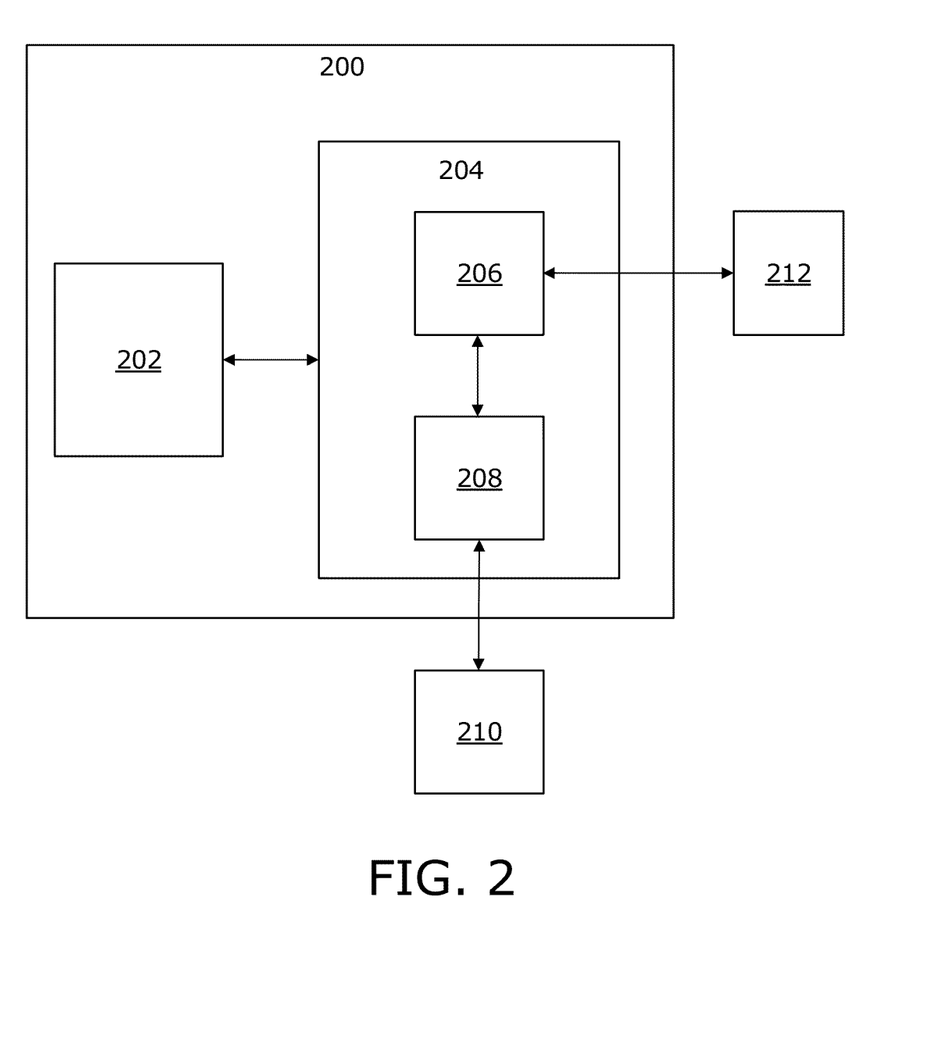
FIG. 2 illustrate a block diagram of a system for guiding Large Language Models (LLMs) for task planning and execution, in accordance with an embodiment of the present disclosure.

Referring to FIG. 2, illustrated is a block diagram of a system 200 for guiding Large Language Models (LLMs) for task planning and execution, in accordance with an embodiment of the present disclosure. As shown, the system 200 comprises a data repository 202. Moreover, the system 200 comprises at least one processor (depicted as a processor 204), wherein the at least one processor 204 is communicably coupled to the data repository 202. The at least one processor 204 is configured to execute a software framework 206 to create a playbook database comprising a set of playbooks, at the data repository 202, wherein each playbook has a corresponding descriptor indicative of a task that it guides execution of, and comprises plain text descriptions of a corresponding set of sub-tasks to be executed for execution of the task. Moreover, the software framework 206 is executed to obtain a user query received by a Large Language Model (LLM) 208, wherein the user query pertains to a request for execution of a given task. Furthermore, the software framework 206 is executed to determine whether the given task matches the corresponding descriptor of any playbook from amongst the set of playbooks. Furthermore, when it is determined that the given task matches a given descriptor of a given playbook from amongst the set of playbooks, the LLM 208 selects one or more external tools 212, wherein the one or more external tools read the plain text descriptions of the given set of sub-tasks. Furthermore, the software framework 206 associated with the LLM executes the given set of sub-tasks in the given playbook, using the one or more external tools 212, in co-ordination with the LLM 208. Furthermore, the LLM 208 generates a query response including results of the execution of the given set of sub-tasks, and sends the query response to the user device 210.

Figure 3:
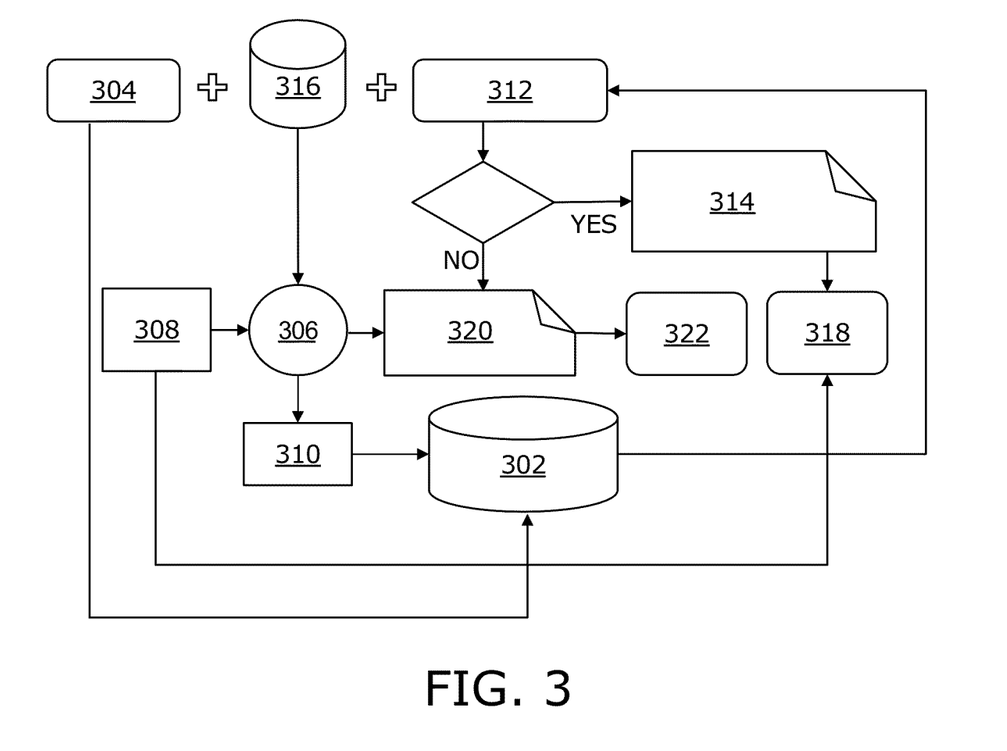
FIG. 3 illustrate a flowchart for depicting an implementation scenario of a system for guiding Large Language Models (LLMs) for task planning and execution, in accordance with an embodiment of the present disclosure.

Referring to FIG. 3, illustrated is a flowchart for depicting an implementation scenario of a system 300 for guiding Large Language Models (LLMs) for task planning and execution, in accordance with an embodiment of the present disclosure. As shown, a playbook database 302 comprising a set of playbooks is created using a playbook submission tool 304. Moreover, a language learning model (LLM) 306 receives a user query 308, wherein the user query 308 pertains to a request for execution of a given task. Furthermore, a software framework 310 obtains the user query 308 received by the LLM 306. Subsequently, the software framework 310 determines whether the given task matches a corresponding descriptor of any playbook from amongst the set of playbooks in the playbook database 302, using a playbook selection tool 312. Furthermore, when it is determined that the given task matches a given descriptor of a given playbook 314, a given set of sub-tasks in the given playbook 314 are executed using one or more external tools (depicted as an external tool 316), where a data returned from the execution of the given set of sub-tasks in the given playbook 314 using the one or more external tools 316, is used to generate a second response 318 for a user. Alternatively, when it is determined that the given task does not match a corresponding descriptor of any playbook from amongst the set of playbooks in the playbook database 302, a plan of action 320 is generated by the LLM to guide the execution of the given task. Subsequently, a set of LLM-generated sub-tasks in the plan of action 320 are executed using one or more external tools 316 to generate a fourth response 322 for a user.

Figure 4:
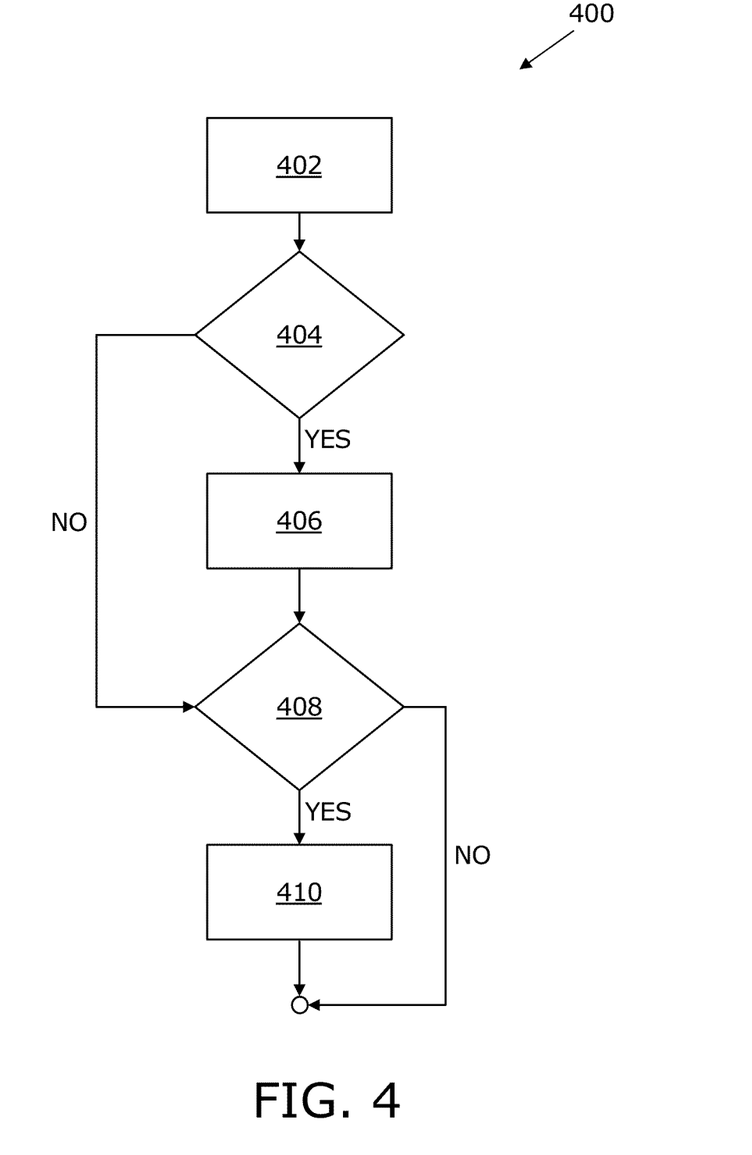
FIG. 4 illustrate a flowchart for depicting an execution of a corresponding set of sub-tasks of a playbook in a graphical order, in accordance with an embodiment of the present disclosure.

Referring to FIG. 4, illustrated is a flowchart depicting an execution of a given set of sub-tasks of a given playbook 400 in a graphical order, in accordance with an embodiment of the present disclosure. As shown, the execution of the given set of sub-tasks starts with the execution of a first sub-task 402 from amongst the given set of sub-tasks. Subsequently, a second sub-task 404 from amongst the given set of sub-tasks is executed. If an output from the execution of the second sub-task 404 is yes, then a third sub-task 406 from amongst the given set of sub-tasks is executed after the execution of the second sub-task 404. Subsequently, a fourth sub-task 408 from amongst the given set of sub-tasks is executed after the execution of the third sub-task 406. Alternatively, if the output from the execution of the second sub-task 404 is no, then the fourth sub-task 408 from amongst the given set of sub-tasks is executed after the execution of the second sub-task 404. If an output from the execution of the fourth sub-task 408 is yes, then a fifth sub-task 410 from amongst the given set of sub-tasks is executed after the execution of the fourth sub-task 408, where an output from the execution of the fifth sub-task 410 is a final output for the execution of the given set of sub-tasks of the given playbook 400. Alternatively, if the output from the execution of the fourth sub-task 408 is no, then the output from the execution of the fourth sub-task 408 is the final output for the execution of the given set of sub-tasks of the given playbook 400.

The invention claimed is:

1. A method for guiding Large Language Models (LLMs) for task planning and execution, the method comprising:
creating a playbook database comprising a set of playbooks, wherein each playbook has a corresponding descriptor indicative of a task that it guides execution of, and comprises plain text descriptions of a corresponding set of sub-tasks to be executed for execution of the task;
obtaining a user query received by a Large Language Model (LLM), wherein the user query pertains to a request for execution of a given task; and
determining whether or not the given task matches the corresponding descriptor of any playbook from amongst the set of playbooks;
wherein when it is determined that the given task matches a given descriptor of a given playbook from amongst the set of playbooks:
the LLM selects one or more external tools, wherein the one or more external tools read the plain text descriptions of the given set of sub-tasks;
a software framework associated with the LLM tracks and executes the given set of sub-tasks in the given playbook, using the one or more external tools, in coordination with the LLM; and
the LLM generates a query response including results of the execution of the given set of sub-tasks, and sends the query response to the user device.

2. The method of claim 1, wherein the step of creating the playbook database comprises:
receiving corresponding descriptors and plain text descriptions of corresponding sets of sub-tasks, for a plurality of playbooks;
performing at least one sanity check on the plurality of playbooks;
determining whether or not at least one of the plurality of playbooks passes the at least one sanity check; and
when it is determined that the at least one of the plurality of playbooks passes the at least one sanity check, adding the at least one of the plurality of playbooks, to the playbook database.

3. The method of claim 2, wherein the step of performing the at least one sanity check on the plurality of playbooks comprises at least one of:
for each playbook from amongst the set of playbooks that are stored in the playbook database, generating a plurality of similarity scores indicative of a similarity between the corresponding descriptor of said playbook in the playbook database and corresponding descriptors of the plurality of playbooks;
generating quality scores indicative of a quality of the corresponding sets of sub-tasks in the plurality of playbooks, based on the plain text descriptions of the corresponding sets of sub-tasks in the plurality of playbooks;

and wherein the step of determining whether or not the at least one of the plurality of playbooks passes the at least one sanity check comprises at least one of:
  comparing the plurality of similarity scores with a threshold similarity score, wherein the at least one of the plurality of playbooks passes the at least one sanity check when a similarity score associated with its corresponding descriptor is less than the threshold similarity score;
  comparing the quality scores indicative of the quality of the corresponding sets of sub-tasks in the plurality of playbooks with a threshold quality score, wherein the at least one of the plurality of playbooks passes the at least one sanity check when a quality score associated with its corresponding set of sub-tasks is greater than or equal to the threshold quality score.

4. The method of claim 1, wherein the step of determining whether or not the given task matches any corresponding descriptor of any playbook from amongst the set of playbooks comprises comparing a context of a corresponding descriptor of the set of playbooks with a context of the given task, wherein when the context of any corresponding descriptor of any playbook matches the context of the given task, then that playbook is selected to be the given playbook.

5. The method of claim 1, wherein the step of determining whether or not the given task matches the any corresponding descriptor of any playbook from amongst the set of playbooks further comprises:
  generating embeddings of the corresponding descriptors of the set of playbooks and storing the embeddings in a vector database;
  transforming the user query into a query embedding;
  identifying that playbook whose corresponding embedding most closely matches the query embedding, based on at least one of: a cosine similarity score, a threshold value, to be the given playbook.

6. The method of claim 1, wherein when it is determined that the given task does not match any corresponding descriptor of any playbook from amongst the set of playbooks, the method further comprises creating a new playbook to be added to the playbook database, by:
  receiving a corresponding descriptor indicative of the given task, and plain text descriptions of a corresponding set of sub-tasks to be executed for the execution of the given task, for the new playbook,
  performing at least one sanity check on the new playbook;
  determining whether or not the new playbook passes the at least one sanity check; and
  when it is determined that the new playbook passes the at least one sanity check,
    adding the new playbook to the set of playbooks in the playbook database; and
    repeating the step of determining whether or not the given task matches any corresponding descriptor of any playbook from amongst the set of playbooks.

7. The method of claim 1, wherein in any playbook from amongst the set of playbooks, plain text descriptions of a given sub-task from amongst a corresponding set of sub-tasks in said playbook comprise a reference to one or more other playbooks from amongst the set of playbooks in the playbook database, and wherein when executing the given sub-task, a corresponding set(s) of sub-tasks in the one or more other playbooks are executed.

8. The method of claim 1, wherein the one or more external tools are accessed via one or more Application Programming Interfaces (APIs).

9. The method of claim 1, wherein the set of sub-tasks in the given playbook are executed in at least one of: a sequential order, a graphical order, a dynamically changing order.

10. The method of claim 1, wherein the given task is a cyber security task.

11. A system for guiding Large Language Models (LLMs) for task planning and execution, the system comprising:
  a data repository; and
  at least one processor communicably coupled to the data repository, wherein the at least one processor is configured to execute a software framework to:
    create a playbook database comprising a set of playbooks, at the data repository, wherein each playbook has a corresponding descriptor indicative of a task that it guides execution of, and comprises plain text descriptions of a corresponding set of sub-tasks to be executed for execution of the task;
    obtain a user query received by a Large Language Model (LLM), wherein the user query pertains to a request for execution of a given task; and
    determine whether the given task matches the corresponding descriptor of any playbook from amongst the set of playbooks;
  wherein when it is determined that the given task matches a given descriptor of a given playbook from amongst the set of playbooks:
    the LLM selects one or more external tools, wherein the one or more external tools read the plain text descriptions of the given set of sub-tasks;
    the software framework associated with the LLM tracks and executes the given set of sub-tasks in the given playbook, using the one or more external tools, in coordination with the LLM; and
    the LLM generates a query response including results of the execution of the given set of sub-tasks, and sends the query response to the user device.

12. The system of claim 11, wherein to create the playbook database, the software framework is further executed to:
  receive corresponding descriptors and plain text descriptions of corresponding sets of sub-tasks, for a plurality of playbooks;
  perform at least one sanity check on the plurality of playbooks;
  determine whether or not at least one of the plurality of playbooks passes the at least one sanity check; and
  when it is determined that the at least one of the plurality of playbooks passes the at least one sanity check, add the at least one of the plurality of playbooks, to the playbook database.

13. The system of claim 12, wherein to perform the at least one sanity check on the plurality of playbooks, the software framework is further executed to at least one of:
  for each playbook from amongst the set of playbooks that are stored in the playbook database, generate a plurality of similarity scores indicative of a similarity between the corresponding descriptor of said playbook in the playbook database and corresponding descriptors of the plurality of playbooks;
  generate quality scores indicative of a quality of the corresponding sets of sub-tasks in the plurality of playbooks, based on the plain text descriptions of the corresponding sets of sub-tasks in the plurality of playbooks;

and wherein to determine whether or not the at least one of the plurality of playbooks passes the at least one sanity check comprises at least one of:

compare the plurality of similarity scores with a threshold similarity score, wherein the at least one of the plurality of playbooks passes the at least one sanity check when a similarity score associated with its corresponding descriptor is less than the threshold similarity score;

compare the quality scores indicative of the quality of the corresponding sets of sub-tasks in the plurality of playbooks with a threshold quality score, wherein the at least one of the plurality of playbooks passes the at least one sanity check when a quality score associated with its corresponding set of sub-tasks is greater than or equal to the threshold quality score.

14. The system of claim 11, wherein to determine whether or not the given task matches any corresponding descriptor of any playbook from amongst the set of playbooks, the software framework is further executed to compare a context of a corresponding descriptor of the set of playbooks with a context of the given task, wherein when the context of any corresponding descriptor of any playbook matches the context of the given task, then that playbook is selected to be the given playbook.

15. The system of claim 11, wherein to determine whether or not the given task matches the any corresponding descriptor of any playbook from amongst the set of playbooks, the software framework is further executed to:

generate embeddings of the corresponding descriptors of the set of playbooks and storing the embeddings in a vector database;

transform the user query into a query embedding;

identify that playbook whose corresponding embedding most closely matches the query embedding, based on at least one of: a cosine similarity score, a threshold value, to be the given playbook.

16. The system of claim 11, wherein when it is determined that the given task does not match any corresponding descriptor of any playbook from amongst the set of playbooks, to create a new playbook to be added to the playbook database, the software framework is further configured to:

receive a corresponding descriptor indicative of the given task, and plain text descriptions of a corresponding set of sub-tasks to be executed for the execution of the given task, for the new playbook, perform at least one sanity check on the new playbook;

determine whether or not the new playbook passes the at least one sanity check; and when it is determined that the new playbook passes the at least one sanity check, add the new playbook to the set of playbooks in the playbook database; and repeat the step of determining whether or not the given task matches any corresponding descriptor of any playbook from amongst the set of playbooks.

17. The system of claim 11, wherein in any playbook from amongst the set of playbooks, plain text descriptions of a given sub-task from amongst a corresponding set of sub-tasks in said playbook comprise a reference to one or more other playbooks from amongst the set of playbooks in the playbook database, and wherein when executing the given sub-task, a corresponding set(s) of sub-tasks in the one or more other playbooks are executed.

18. The system of claim 11, wherein the set of sub-tasks in the given playbook are executed in at least one of: a sequential order, a graphical order, a dynamically changing order.

19. The system of claim 11, wherein the given task is a cyber security task.

20. The computer program product comprising a non-transitory computer-readable storage medium having computer-readable instructions stored thereon, the computer-readable instructions being executable by at least one processor configured to execute a method as claimed in claim 1.

* * * * *